US012406795B2

(12) United States Patent
Teshigawara et al.

(10) Patent No.: US 12,406,795 B2
(45) Date of Patent: Sep. 2, 2025

(54) COIL COMPONENT AND ELECTRONIC DEVICE

(71) Applicant: TAIYO YUDEN CO., LTD., Tokyo (JP)

(72) Inventors: Hidekazu Teshigawara, Tokyo (JP); Masanori Nagano, Tokyo (JP)

(73) Assignee: TAIYO YUDEN CO., LTD., Tokyo (JP)

( * ) Notice: Subject to any disclaimer, the term of this patent is extended or adjusted under 35 U.S.C. 154(b) by 879 days.

(21) Appl. No.: 17/667,280

(22) Filed: Feb. 8, 2022

(65) Prior Publication Data

US 2022/0301763 A1 Sep. 22, 2022

(30) Foreign Application Priority Data

Mar. 19, 2021 (JP) ................................ 2021-046344

(51) Int. Cl.

*H01F 27/28* (2006.01)
*H01F 1/147* (2006.01)
*H01F 27/255* (2006.01)
*H01F 27/29* (2006.01)

(52) U.S. Cl.

CPC ............. *H01F 27/29* (2013.01); *H01F 1/147* (2013.01); *H01F 27/255* (2013.01); *H01F 27/2804* (2013.01); *H01F 2027/2809* (2013.01)

(58) Field of Classification Search

USPC ................................ 336/192, 198, 200, 232
See application file for complete search history.

(56) References Cited

U.S. PATENT DOCUMENTS

2014/0292141 A1* 10/2014 Nishisaka ............ H10N 30/872 336/200
2015/0116901 A1* 4/2015 Sasaoka ................. H01C 7/008 361/301.4
2019/0304666 A1* 10/2019 Arai ....................... H05K 1/111
2020/0005993 A1* 1/2020 Takezawa ........... H01F 27/2828
2020/0176176 A1* 6/2020 Arai .................... H01F 27/2804
2021/0272740 A1* 9/2021 Wakabayashi ...... H01F 27/2804
2023/0055987 A1* 2/2023 Muneishi .................. H01F 5/06

FOREIGN PATENT DOCUMENTS

JP 9-148118 A 6/1997
JP 2007-27353 A 2/2007

* cited by examiner

*Primary Examiner* — Shawki S Ismail
*Assistant Examiner* — Kazi S Hossain
(74) *Attorney, Agent, or Firm* — Stein IP, LLC

(57) ABSTRACT

[PROBLEM]
To suppress the formation of an external electrode extending to an unintended part.
[MEANS FOR RESOLUTION]
A coil component 300 comprises: a magnetic substrate 10 including metal magnetic particles structured from a soft magnetic alloy that has iron as the main component; a coil conductor 30 provided on the magnetic substrate 10; a glass film 50, provided on a surface of the magnetic substrate 10, made from a low-temperature sintered glass including a filler of titanium oxide, zirconium oxide, and/or tungsten oxide; and an external electrode 60, provided in contact with the glass film 50, connected electrically to the coil conductor 30.

12 Claims, 15 Drawing Sheets

[FIG. 2]
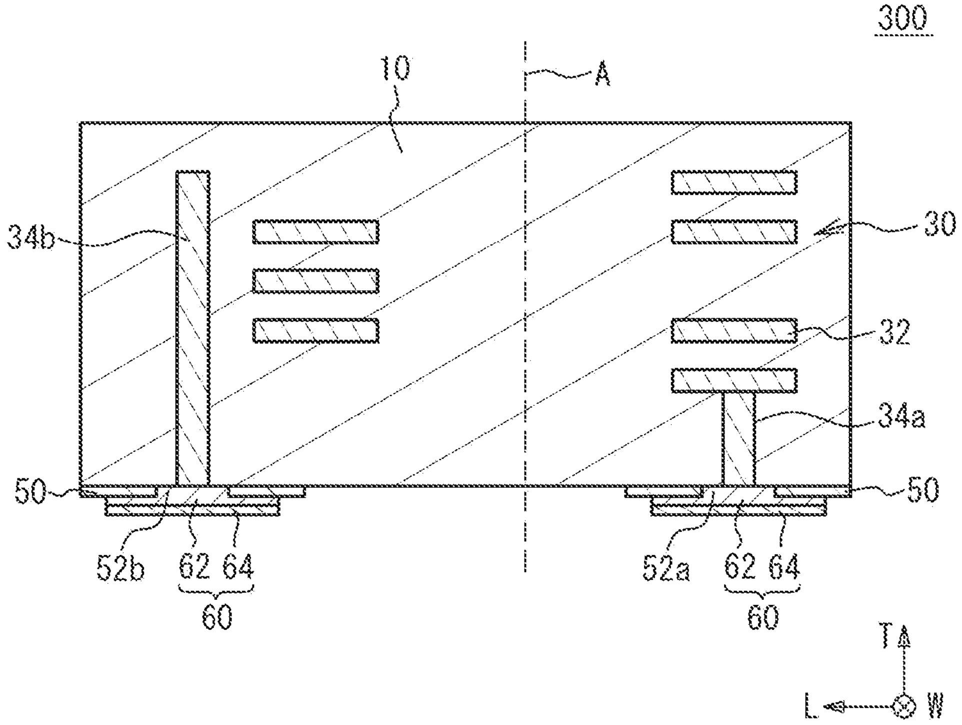

[FIG. 3]
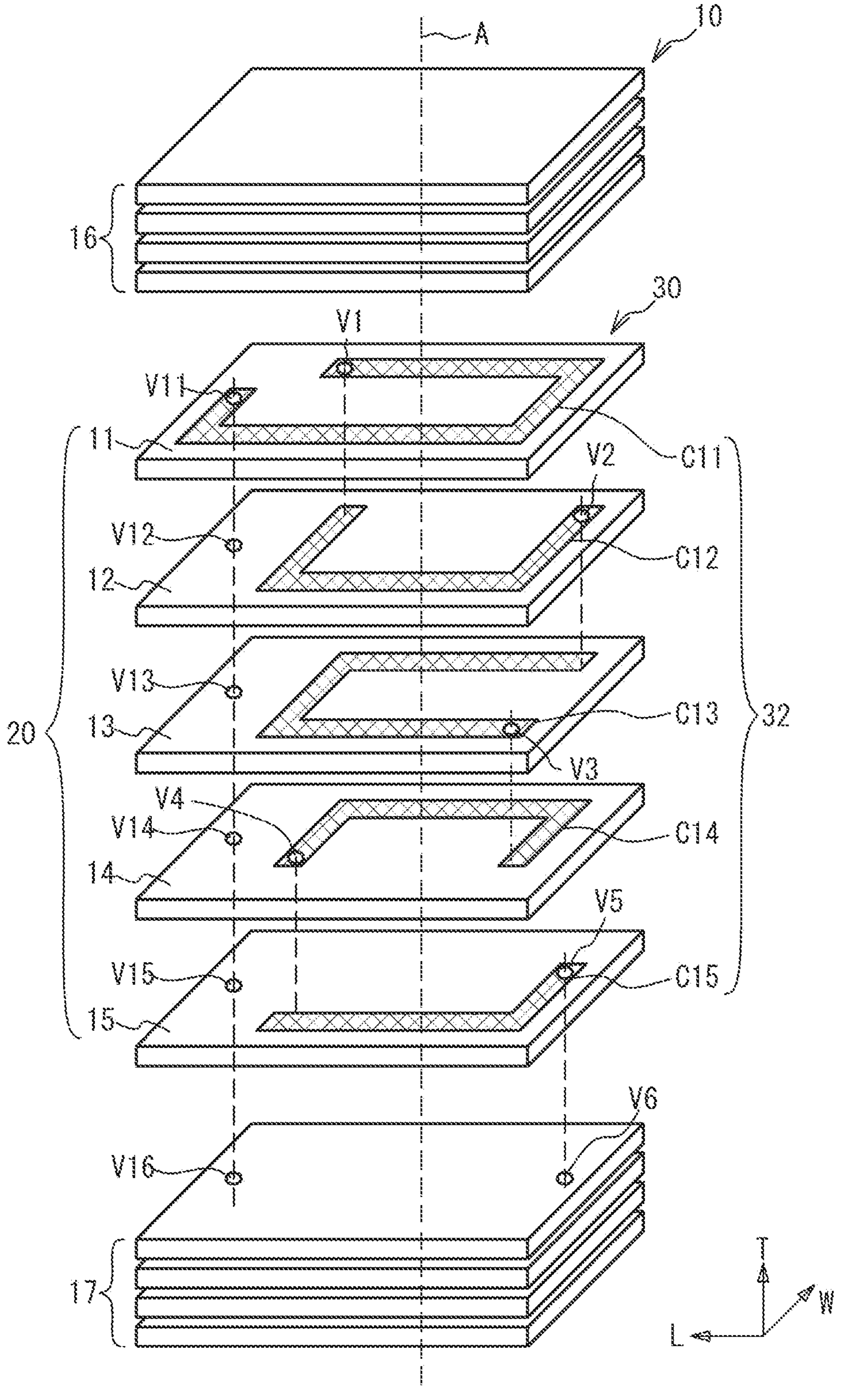

Iron

Silicon

Oxygen

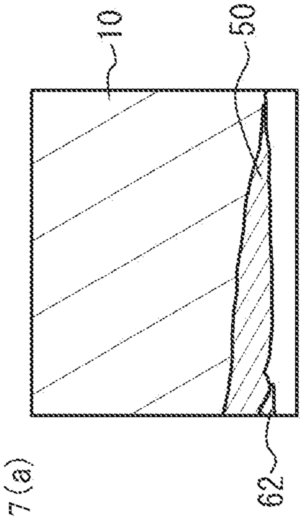
FIG. 7(a)
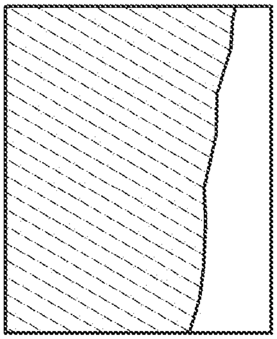
FIG. 7(b) Iron
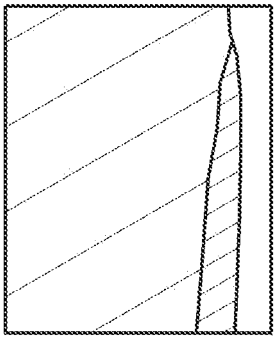
FIG. 7(c) Silicon
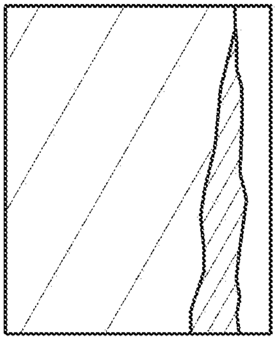
FIG. 7(d) Oxygen
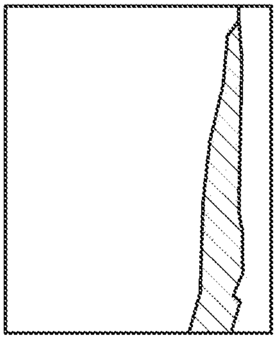
FIG. 7(e) Titanium

[FIG. 9]
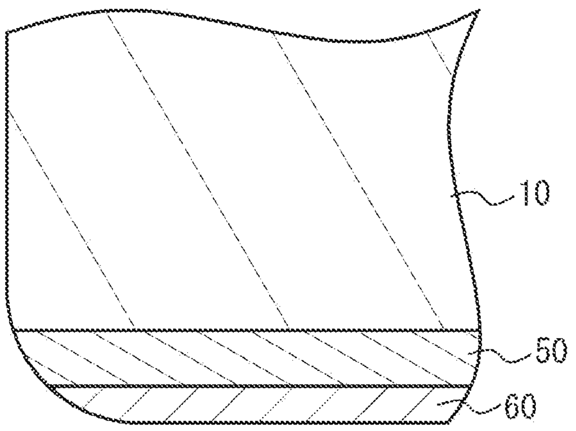

[FIG. 10]
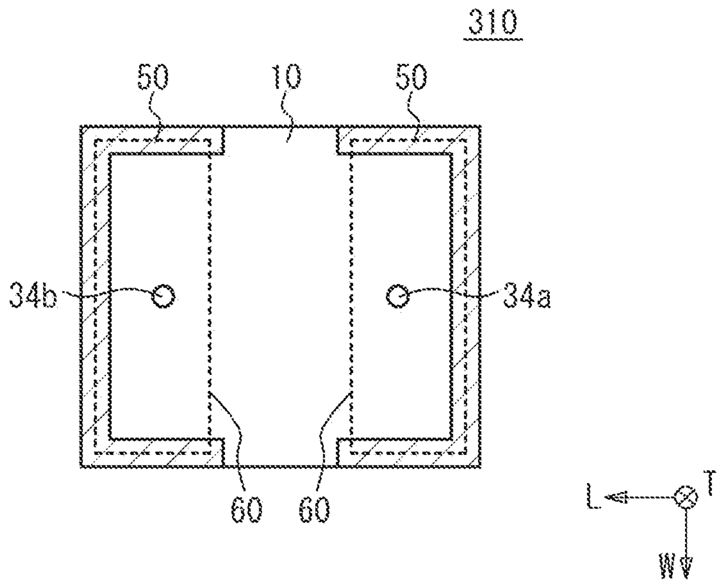

[FIG. 14]
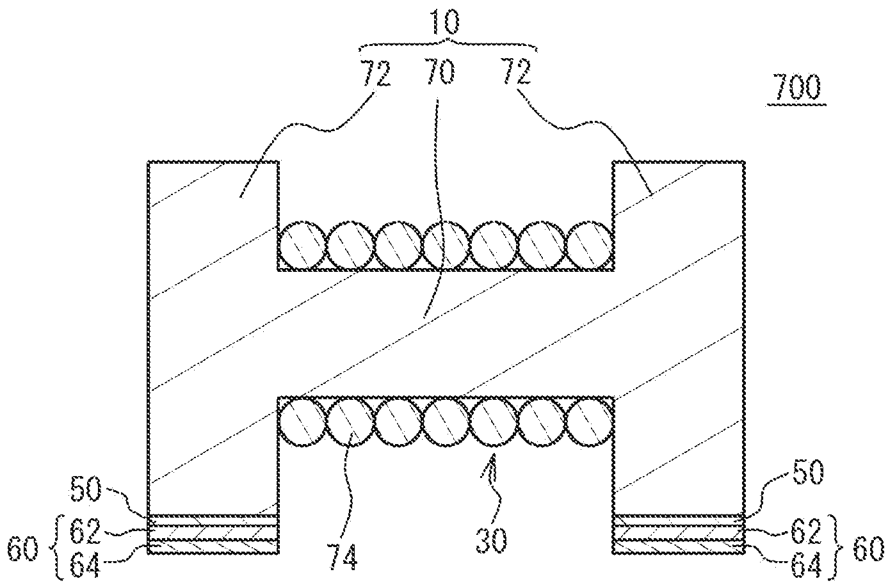

[FIG. 15]
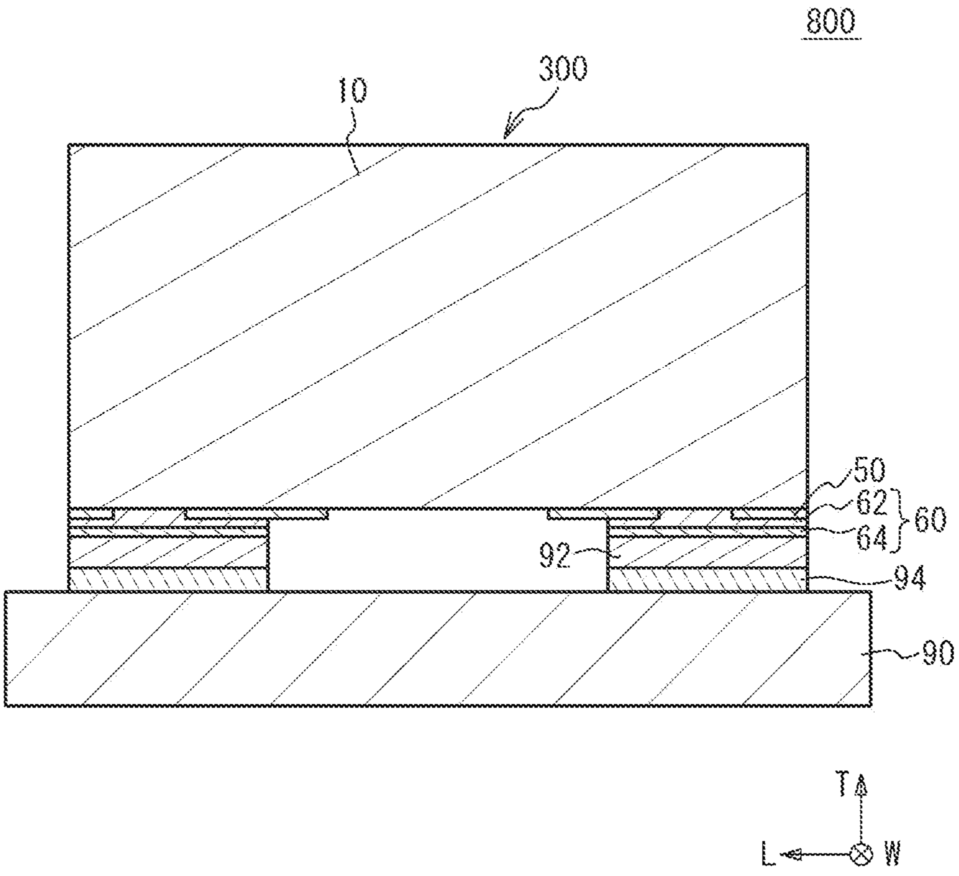

COIL COMPONENT AND ELECTRONIC DEVICE

FIELD OF TECHNOLOGY

The present invention relates to coil components and electronic devices.

PRIOR ART

Metal magnetic particles made from soft magnetic alloys with superior magnetic saturation characteristics are used instead of ferrite. For example, it is known that a coil component can be formed through layering a magnetic material layer, formed from a complex of an alloy powder that has, for example, iron, silicon, and aluminum as its main components, and a thermally, durable adhesive agent that includes borosilicate glass or silica, and an electrically conductive layer formed from a conductive powder (in, for example, Patent Document 1). Moreover, it is known that a coil component can be formed through layering a metal magnetic material layer formed from a metal magnetic material paste that includes metal magnetic particles and a thermally curable resin, and a conductor pattern formed from a conductive paste (in, for example, Patent Document 2).

PRIOR ART DOCUMENTS

Patent Documents

[Patent Document 1] Japanese Unexamined Patent Application Publication H9-148118

[Patent Document 2] Japanese Unexamined Patent Application Publication 2007-27353

SUMMARY OF THE INVENTION

Problem Solved by the Present Invention

When compared to ferrite, the electrical resistance of soft magnetic alloys is low. Because of this, when an external electrode is formed using an electrolytic plating method on the surface of a magnetic substrate that is formed using metal magnetic particles made from a soft magnetic alloy, in some cases the external electrode will be formed extending to unintended parts.

The present invention was created in contemplation of the issue set forth above, and the object thereof is to prevent an external electrode from being formed extending to an unintended part.

Means for Solving the Problem

The present invention is a coil component comprising: a magnetic substrate that includes a metal magnetic paste comprising a soft magnetic alloy that has iron as its main component; a coil conductor provided on the magnetic substrate; a glass film, provided on the surface of the magnetic substrate, comprising a low-temperature sintered glass that includes at least one filler selected from titanium oxide, zirconium oxide, and tungsten oxide; and an external electrode, provided in contact with the glass film, and connected electrically to the coil conductor.

In this structure, the external electrode may be structured including a metal film and a plating film on the metal film.

In this structure, the glass film may be structured including the filler at no less than 10 vol. %.

In this structure, the glass film may be structured from a borosilicate glass that includes a titanium oxide tiller and/or a zirconium oxide tiller.

In this structure, the glass film may be provided layered between the magnetic substrate and the external electrode, and may have external dimensions larger than those of the external electrode.

In this structure, the glass film may be structured provided in contact with a ridge of the magnetic substrate.

In this structure, the glass film may be structured having a color that is different from that of the external electrode.

In this structure, the glass film may be given a color that is different from that of the external electrodes through inclusion of a filler made from manganese oxide, cobalt oxide, and/or ferrite.

The present invention is an electronic device comprising a coil component set forth above and a circuit board on which the coil component is mounted.

Effects of the Invention

The present invention enables prevention of formation of an external electrode extending to an unintended part.

BRIEF DESCRIPTIONS OF THE DRAWINGS

FIG. 2 is a cross-sectional diagram of the coil component of FIG. 1.

FIG. 3 is an exploded perspective diagram of a magnetic substrate of the coil component of FIG. 1.

FIG. 7 (*a*) is a schematic diagram of a scanning electron microscope image of a coil component according to a first embodiment, and FIG. 7 (*b*) through FIG. 7 (*e*) are schematic diagrams of energy dispersive x-ray analysis images of the part in NG. 7 (*a*).

FIG. 9 is a cross-sectional drawing of a part of an external electrode provided on a rounded portion of a ridge of a magnetic substrate of a coil component after barrel polishing has been performed.

FIG. 10 is a plan view depicting the state of the glass film through the external electrode of the coil component according to a modified example of the first embodiment.

FIG. 14 is a cross-sectional drawing of a coil component according to a fifth embodiment according to the present invention.

FIG. 15 is a cross-sectional drawing of an electronic device equipped with a coil component according to the first embodiment according to the present invention.

MOST PREFERRED FORMS FOR CARRYING OUT THE PRESENT INVENTION

Embodiments according to the present invention will be explained below, referencing the drawings as appropriate. However, this does not mean that the present invention is limited to the forms that are illustrated. Additionally, structural elements that are shared in a plurality of drawings are assigned identical reference symbols throughout the plurality of drawings. Be aware that, for convenience in explanation, not all drawings are necessarily drawn to scale.

First Embodiment

Figure 1A:
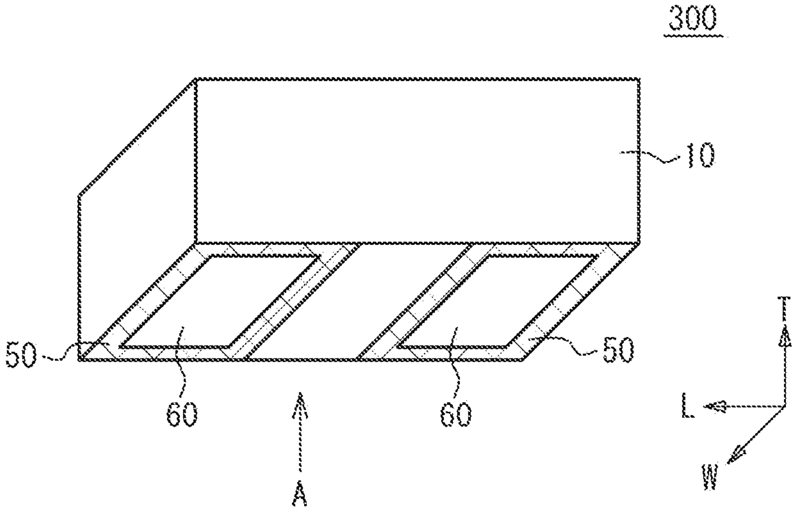
FIG. 1 (*a*) is a perspective diagram of a coil component according to the first embodiment according to the present invention, and FIG. 1 (*b*) is a plan view wherein the coil component of FIG. 1 is viewed from the A direction.
Figure 1B:
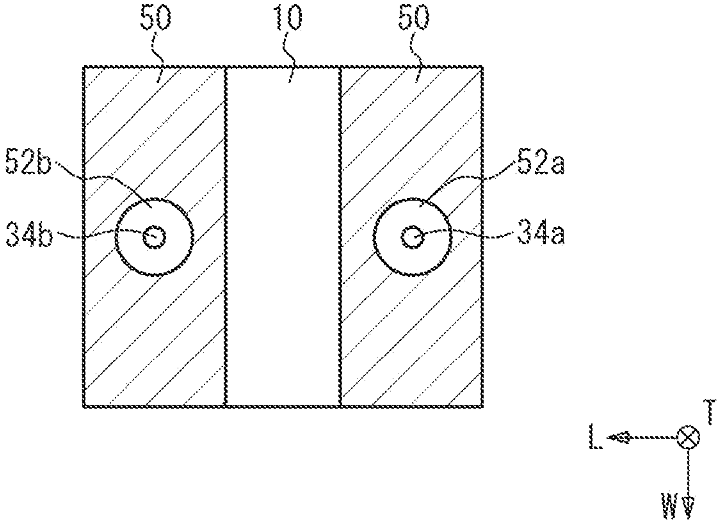

FIG. 1 (*a*) is a perspective diagram of a coil component 300 according to a first embodiment according to the present invention, and FIG. 1 (*b*) is a plan view, viewed from the A direction, of the coil component 300 of FIG. 1. In FIG. 1 (*b*), the drawing is viewed through the external electrode 60. FIG. 2 is a cross-sectional drawing of the coil component 300 of FIG. 1. FIG. 3 is an exploded perspective diagram of the magnetic substrate 10 of the coil component 300 of FIG. 1. Note that in FIG. 1 (*a*) and FIG. 2, for clarity in the drawings, the size of the glass film 50 at each of the pails on the four sides of the external electrodes 60 is different from that in FIG. 8, described below, where the exposed portion of the glass film 50 is illustrated enlarged. A layered inductor that is used as a passive element in a variety of circuits is depicted in FIGS. 1 (*a*), 1 (*b*), 2, and 3, The layered inductor is an example of a coil component that can be applied in the present invention. The present invention can be applied to power inductors used in DC-DC converters and to a variety of other components.

The coil component 300 according to the first embodiment, as illustrated in FIGS. 1 (*a*), 1 (*b*), 2, and 3, comprises a magnetic substrate 10, a coil conductor 30 that is embedded in the magnetic substrate 10, a glass film 50, and a pair of external electrodes 60 that are connected electrically to the coil conductor 30. The "length" direction, "width" direction, and "height" direction of the coil component 300 are, respectively, the "L-axial" direction, the "W-axial" direction, and the "T-axial" direction. The L axis, W axis, and T axis are mutually, perpendicular. The coil axis A of the coil conductor 30 extends along the T-axial direction. While there is no particular limitation on the size of the magnetic substrate 10, the length dimension (the dimension in the L-axial direction) may be, for example, between 0.2 mm and 6.0 mm, the width dimension (the dimension in the W-axial direction) may be, for example, between 0.1 mm and 4.5 mm, and the height dimension (the dimension in the T-axial direction) may be, for example, between 0.1 mm and 4.0 mm.

The magnetic substrate 10 has a substantially rectangular prism shape. The outer surfaces of the magnetic substrate 10 are defined by six planes. Note that a "substantially rectangular prism shape" includes cases wherein the individual vertices are rounded, the individual edges (the boundary portions between sides) are rounded, and the individual surfaces are curved surfaces.

In this first embodiment, when a reference is made to the "vertical direction" of the coil component 300, this is in reference to the vertical direction in FIGS. 1 (*a*), 2, and 3. That is, the positive T-axial direction is up and the negative T-axial direction is down.

The magnetic substrate 10 is formed including metal magnetic particles comprising a soft magnetic alloy that has iron as the main component. In each embodiment, the magnetic substrate 10 is formed through bonding together a plurality of metal magnetic particles through oxide films that are formed on the surfaces of the metal magnetic particles, but the magnetic substrate 10 may, alternatively, be formed through securing the plurality of metal magnetic particles using resin. The oxide film formed on the surface of a metal magnetic particle is an oxide of the soft magnetic alloy. Iron being the main component refers to a case wherein the proportion of iron in respect to the total amount of elements structuring the soft magnetic alloy is no less than 50 wt % (percent by weight), and may be 70 wt % or more, or may be 80 wt % or more, or may be 90 wt % or more.

For example, the metal magnetic particles may be alloy particles that include iron and silicon, or may be alloy particles that include iron and a metal element M that is more easily ionized than iron. The metal element M may be, for example, chromium, aluminum, zirconium, titanium, manganese, or the like. As an example, the metal magnetic particles may be alloy particles of iron, silicon, and one or more types of metal elements M (for example, chromium and/or aluminum) that are more easily ionized than iron. The proportion of iron may be between 85 wt % and 97 wt %, the proportion of silicon may be between 1.5 wt % and 7 wt %, and the proportion of the metal element M may be between 1.5 wt % and 8 wt %. The metal magnetic particles may include unintentional impurities such as oxygen and/or carbon, or the like. The proportion of impurities may be 1 wt % or less. Additionally, the metal magnetic particles may include cobalt, nickel, copper, sulfur, phosphorus, boron, and the like. The composition ratios in the metal magnetic particles can be calculated through the ZAF method, for example, by imaging a cross section of the magnetic substrate 10 using a scanning electron microscope with a magnification between about 2000× and 20,000×, and performing energy dispersive x-ray analysis (EDS).

The coil conductor 30 has a coil portion 32. The coil portion 32 has coil patterns C11 through C15 and vias V1 through V4. The coil patterns C11 through C15 extend along the plane that is perpendicular to the coil axis A (the LW plane), and are mutually separated in the direction of the coil axis A (the T-axial direction). Of the coil patterns C11 through C15, coil patterns that are adjacent in the T-axial direction are connected electrically through the vias V1 through V4. The coil portion 32 that surrounds the coil axis A is formed thereby.

One end of the coil portion 32 is connected electrically to one of the external electrodes 60 through a lead portion 34*a* that is formed by vias V5 and V6. The other end of the coil portion 32 is connected electrically to the other external electrode 60 through a lead portion 34*b* that is formed through vias V11 through V16.

The magnetic substrate 10 has: a main unit portion 20 comprising the magnetic material layers 11 through 15 in which the coil portion 32 is provided; a top cover layer 16 comprising one or more layers, provided on the main unit portion 20; and a bottom cover layer 17, comprising one or more layers, provided below the main unit portion 20. The coil patterns C11 and vias V1 and V11 are formed in the magnetic material layer 11, the coil pattern C12 and the vias V2 and V12 are formed in the magnetic material layer 12, the coil pattern C13 and the vias V3 and V13 are formed in the magnetic material layer 13, the coil pattern C14 and the vias V4 and V14 are formed in the magnetic material layer 14, and the coil pattern C15 and the vias V5 and V15 are formed in the magnetic material layer 15, Vias V6 and V16 are formed in the bottom cover layer 17.

The coil patterns C11 to C15 and vias V1 through V6 and V11 through V16 are formed from a metal material with superior conductivity, such as, for example, silver, palladium, copper, or aluminum, or from an alloy thereof.

The glass film 50 is provided on the surface of the magnetic substrate 10. In this first embodiment, the glass film 50 is provided, separated in the L-axial direction, on the bottom face, among the six bases that formed the outer surface of the magnetic substrate 10. The glass film 50 is formed from a low-temperature sintered glass that includes a metal oxide filler of titanium oxide ($TiO_2$), zirconium oxide ($ZrO_2$), and/or tungsten oxide ($WO_3$). For example, the glass film 50 is formed from a borosilicate glass that includes a titanium oxide filler. The inclusion proportion of the titanium oxide filler is no less than, for example, 10 vol % (percent by volume). The glass part and the metal oxide filler part in the glass film 50 can be identified through SEM observation. For example, the glass part will appear as irregular shapes, where the metal oxide filler part will appear as particles having grain boundaries. It is possible to discriminate between the two through contrast, and they can be distinguished from each other through carrying out component analysis through EDS analysis.

The external electrode 60 is provided in contact with the glass film 50. The external electrode 60 may be provided so as to overlap the glass film 50 in the plan view. In this first embodiment, the external electrode 60 is provided on the bottom face of the glass film 50, except for the parts wherein the lead portion 34*a* or lead portion 34*b* is exposed from the magnetic substrate 10 and the parts for the opening 52*a* or opening 52*b* that is provided therearound. That is, except for the parts where the lead portion 34*a* or lead portion 34*h* is exposed from the magnetic substrate 10, and the parts of the opening 52*a* or the opening 52*b* that is provided therearound, the glass film 50 is layered between the external electrode 60 and the magnetic substrate 10. In the plan view, the glass film 50 is larger than the external electrode 60. That is, in the plan view the external electrode 60 does not cover the entire glass film 50, and there is a part where the glass film 50 can be seen alone. One of the pair of external electrodes 60 is filled into an opening 52*a* that is provided in the glass film 50, to connect electrically to the lead portion 34*a*, and the other is filled into an opening 52*b* that is provided in the glass film 50, to connect electrically to the lead portion 34*b*. The size of the opening 52*a* or the opening 52*b* is larger than the part wherein the lead portion 34*a* or lead portion 34*b* is exposed from the magnetic substrate 10, and preferably is provided up to the periphery thereof, but instead may be provided with the same dimensions as the part wherein the lead portion 34*a* or lead portion 34*b* is exposed from the magnetic substrate 10. Moreover, the size of the opening 52*a* or opening 52*b* may be smaller in relation to the parts wherein the lead portion 34*a* or lead portion 34*b* is exposed from the magnetic substrate 10, and a portion of the parts wherein the lead portion 34*a* or the lead portion 34*b* is exposed from the magnetic substrate 10 may be covered with the glass film 50. The external electrode 60 has a metal film 62 and a plating film 64 that is provided on the bottom face of the metal film 62. The metal film 62 may be, for example, silver, palladium, copper, or an alloy thereof. The plating film 64 is a layered film of, for example, a nickel plating film and a tin plating film.

[Method for Manufacturing]

An example of a method for manufacturing the coil component 300 according to the first embodiment will be explained. First a top layered body that serves as the top cover layer 16 is formed. The top layered body is formed through layering a plurality of magnetic material sheets. The magnetic material sheet is produced through, for example, coating a slurry onto the surface of a base film made from plastic, drying, and then cutting the slurry to a prescribed size after drying. The slurry is manufactured by mixing metal magnetic particles, made from a soft magnetic alloy that has iron as the main ingredient, with an organic binder and solvent, and the like. The organic binder uses, for example, a resin material with superior insulation, such as polyvinyl butyral (PVB) resin, epoxy resin, or the like. Toluene, for example, may be used for the solvent.

A bottom layered body that will serve as the bottom cover layer 17 is formed next. The bottom layered body is formed through layering compound sheets wherein conductor vias of unbaked magnetic material sheets, described above, are provided. Through holes are formed at positions corresponding to vias V6 and V16 of the magnetic material sheet, and screen printing, for example, is used to fill the through holes with an electrically conductive paste. Note that the conductor vias may be formed through a method other than screen printing.

Next an intermediate layered body that will serve as the main unit portion 20 is formed. The intermediate layered body is formed through layering, onto a magnetic material sheet that will serve as the magnetic material layers 11 through 15, a compound sheet provided with an unbaked conductor pattern that will serve as the coil patterns C11 through C15, and unbaked conductor vias that will serve as vias V1 through V5 and V11 through V15. In order to form this compound sheet, first through holes are formed in positions, in the magnetic material sheet, described above, that will correspond to the vias V1 through V5 and V11 through V15. The unbaked conductor pattern is then formed on the magnetic material sheet by printing an electrically conductive paste onto the magnetic material sheet using, for example, screen printing. In this case, the electrically conductive paste fills in the through holes formed in the magnetic material sheet. Through this, the unbaked conductor pattern that will serve as the coil patterns C11 through C15 and the unbaked conductor vias that will serve as vias V1 through V5 and V11 through V15 are formed on the magnetic material sheet. Note that the conductor patterns and the conductor vias may be formed through a method other than screen printing.

Following this, an insulator pattern that will serve as the glass film 50 is formed on the bottom face of the magnetic material sheet that will serve as the bottommost layer of the magnetic substrate 10 (for example, the magnetic material sheet of the bottommost layer of the bottom layered body). The insulator pattern is formed through printing a glass paste made from a borosilicate glass that includes a titanium oxide filler. Next an unbaked conductor pattern that will serve as the metal film 62 for the external electrodes 60 is formed through coating an electrically conductive paste onto the bottom face of the insulator pattern that will serve as the glass film 50. The insulator pattern that will serve as the glass film 50 and the unbaked conductor pattern that will serve as the metal film 62 and the external electrode 60 may be formed after forming the main unit layered body through contact bonding, described below, or after forming a chip layered body by dicing the main unit layered body, or formed after performing a heat treatment on the chip layered body, instead of the case wherein they are formed on the magnetic material sheet that will serve as the bottommost layer of the magnetic substrate 10. In this case, at this stage the insulator pattern that will serve as the glass film 50 and the unbaked conductor pattern that will serve as the metal film 62 of the external electrodes 60 would not be formed on the magnetic material sheet that will serve as the bottommost layer of the magnetic substrate 10.

Next, the bottom layered body, the intermediate layered body, and the top layered body are layered together sequentially from the negative direction side to the positive direction side in the T-axial direction. The layered body is formed into the main unit layered body through thermal bonding using a pressing machine. In the step for forming the main unit layered body, pressure is applied, in the layering direction, to the insulator pattern that will serve as the glass film 50 and the conductor pattern that will serve as the metal film 62 of the external electrodes 60. Because of this, in some cases the insulator pattern that will serve as the glass film 50 and the conductor pattern that will serve as the metal film 62 of the external electrodes 60 may fill into the bottom face of the magnetic material sheet that will serve as the bottommost layer of the magnetic substrate 10. When the insulator pattern that will serve as the glass film 50 and the unbaked conductor pattern that will serve as the metal film 62 of the external electrodes 60 are formed after contact bonding, at this stage the insulator patterns and conductor patterns are formed sequentially. The formation of each pattern can use any appropriate existing method. For example, screen printing may be used, or, for example, a transfer method may be used instead.

Following this, a chip layered body is formed through dicing the main unit layered body into the desired size using a cutting machine such as a dicing machine or a laser machine tool. If the insulator pattern that will serve as a glass film 50 and the unbaked conductor pattern that will serve as the metal film 62 for the external electrodes 60 are to be formed after dicing, then, at this stage, the insulator pattern and the conductor pattern are formed sequentially. The formation of each pattern can use any appropriate existing method. For example, a printing method may be used, or, for example, a transfer method may be used, or, for example, a dipping method may be used. Following this, a heat treatment for baking is carried out on the chip layered body. The heat treatment is carried out at a prescribed temperature in an ambient gas that includes oxygen. Through this heat treatment, an oxide film is formed, comprising oxides of the material components of the metal magnetic particles, on the surfaces of the metal magnetic particles included in the bottom layered body, the intermediate layered body, and the top layered body, and the plurality of metal magnetic particles are bonded together through the oxide film. A polishing process, such as barrel polishing, or the like, is performed as necessary on the end portions of the chip layered body. If the insulator pattern that will serve as the glass film 50 and the conductor pattern that will serve as the metal film 62 of the external electrodes 60 is to be formed after the heat treatment, the insulator pattern and the conductor pattern are formed sequentially. The formation of each pattern may use any appropriate existing method. For example, screen printing may be used, or, for example, a transfer method may be used, or, for example, a dipping method may be used, or a thin film process, such as sputtering, or the like, may be used. After formation of the insulator pattern that will serve as the glass film 50 and the conductor pattern that will serve as the metal film 62 of the electrodes 60, a heat treatment may be carried out, if necessary, to produce the glass film 50 and the metal film 62.

The external electrode 60, which is made from a metal film 62 and a plating film 64, is formed through forming a plating film, using an electrolytic plating method, on the surface of the conductor pattern that will serve as the metal film 62 of the external electrodes 60. The coil component 300 is produced thereby.

[First Reference Form]

A coil component according to a first reference form differs from the coil component 300 according to the first embodiment in the point that no glass film is provided on the bottom face of the magnetic substrate. The other structures of the coil component according to the first reference form are identical to those of the coil component 300 according to the first embodiment. The coil component according to the first reference form is formed through a method that is identical to the method for manufacturing described in the first embodiment, except for the point that no glass film is formed.

Figure 4A:
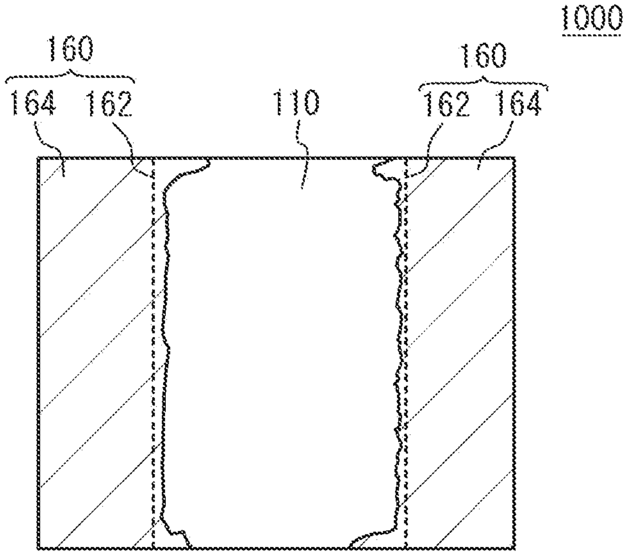
FIG. 4 (*a*) is a bottom view of a coil component according to a first reference form, and FIG. 4 (*b*) is a cross-sectional drawing in the vicinity of the external electrode.
Figure 4B:
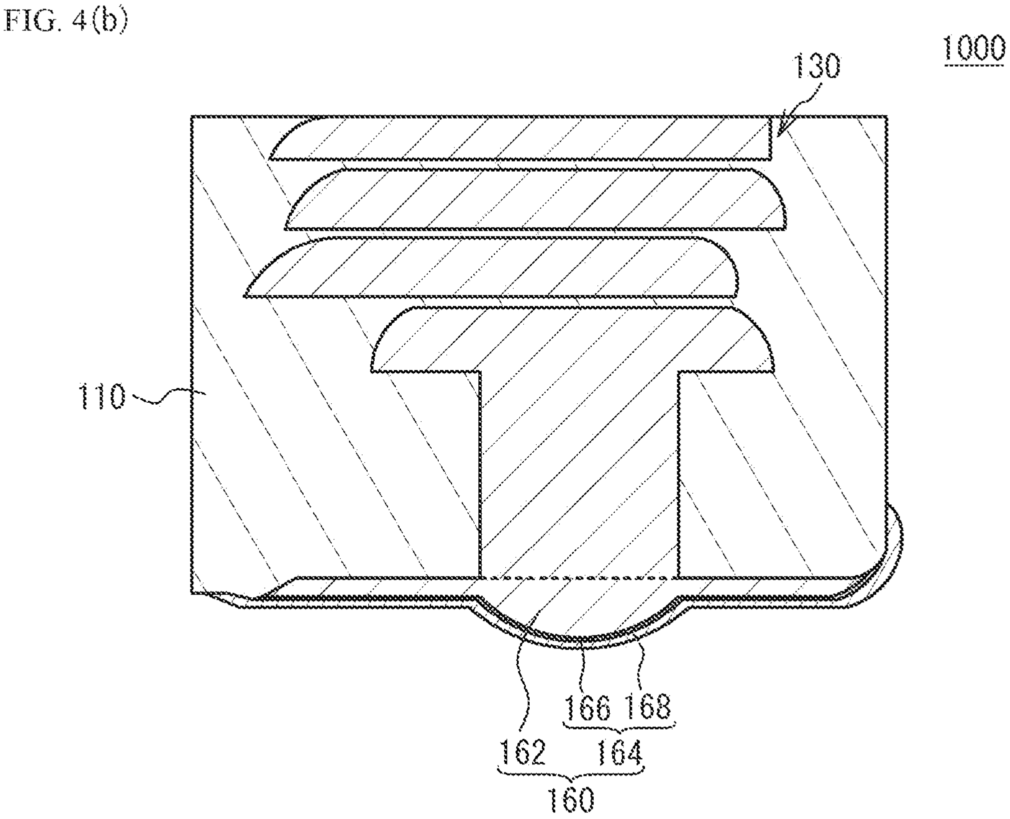

FIG. 4 (*a*) is a bottom view of a coil component 1000 according to the first reference form, and FIG. 4 (*b*) is a cross-sectional diagram of the vicinity of the external electrodes 160, FIG. 4 (*a*) is a diagram showing schematically a microscopic image wherein the bottom face of the coil component 1000 is viewed through an optical microscope, and FIG. 4 (*b*) is a diagram showing schematically an SEM image wherein a cross section of the coil component 1000 is observed using a scanning electron microscope (SEM). In the coil component 1000 that is shown, the magnetic substrate 110 is formed through bonding metal magnetic particles, made from a soft magnetic material of Fe—Si—Cr, through an oxide film that is formed on the surface of the metal magnetic particles. The coil conductor 130 is formed from silver, the external electrode 160 is formed, through an electrolytic plating method, from a metal film 162 made from silver, and the plating film 164 is formed from a nickel plating film 166 and a tin plating film 168, formed through an electrolytic plating method.

As depicted in FIGS. 4 (*a*) and 4 (*b*), in the coil component 1000 according to the first comparative form, the plating film 164 extends further to the outside than the metal film 162. In particular, the plating film 164 is formed extending greatly in the ridge vicinity (the edge vicinity) that structures the magnetic substrate 110.

Why the plating film 164 is formed extending further to the outside than the metal film 162 is thought to be due to the following reasons. The magnetic substrate 110 is formed through bonding together, through an oxide film formed on the surfaces of the metal magnetic particles, metal magnetic particles made from a soft magnetic alloy that has iron as the main component thereof. The surface of the magnetic substrate 110 receives physical impacts in the manufacturing process (for example, during barrel polishing, contamination removal processing, and the like), and thus it can be assumed that the oxide film that is formed on the surfaces of the metal magnetic particles becomes damaged. Because the electrical resistance of the soft magnetic alloy of the metal magnetic particles is low when compared to that of the oxide film that is produced on the surfaces thereof, when the oxide film on the surface of a metal magnetic particle becomes damaged, it can be assumed that the electrical resistance at the surface of the magnetic substrate 110 is low. In particular, because the vicinities of the ridges (the vicinities of the edges) in the magnetic substrate 110 and the vicinities of the vertices (the vicinities of the corners) are most likely to receive physical impacts in the manufacturing process, it can be assumed that the reductions in electrical resistance will be localized on only these parts. Given this, when forming the plating film 164 through an electrolytic plating method, it can be assumed that the plating film 164 will be formed extending further to the outside than the metal film 162, and, in particular, it can be assumed that the plating film 164 will be formed extending further to the outside than the metal film 162 at those parts of the metal film 162 that are formed in the vicinities of the ridges (the vicinities of the edges) or in the vicinities of the vertices (the vicinities of corners) of the magnetic substrate 110.

Because, accompanying miniaturization of electronic devices, coil components are being made smaller as well, the spacing between the pair of external electrodes 160 has become narrower. Because of this, when the external electrode 160 is formed extending to parts that are not intended, the withstand voltage between the pair of external electrodes 160 will become inadequate, with the danger of producing faults in the coil component 1000. In such a case it is possible to prevent such faults through the use of the present invention in particular.

[Second Reference Form]

In order to suppress the formation of external electrodes 160 extending to unintended parts, one may consider provision of an insulative glass film between the magnetic substrate 110 and the external electrodes 160. Given this, in the coil component according to the second reference form a glass film made from a borosilicate glass (not including a titanium oxide filler) is provided between the magnetic substrate 110 and the metal film 162 for forming the external electrodes 160. The component according to the second reference form is structured identically to that of the first embodiment except for the difference in the material for the glass film. Additionally, the coil component according to the second reference form is formed through the same method as the method for manufacturing, explained in the first embodiment, except for the difference of the material for the glass film.

Figure 5A:
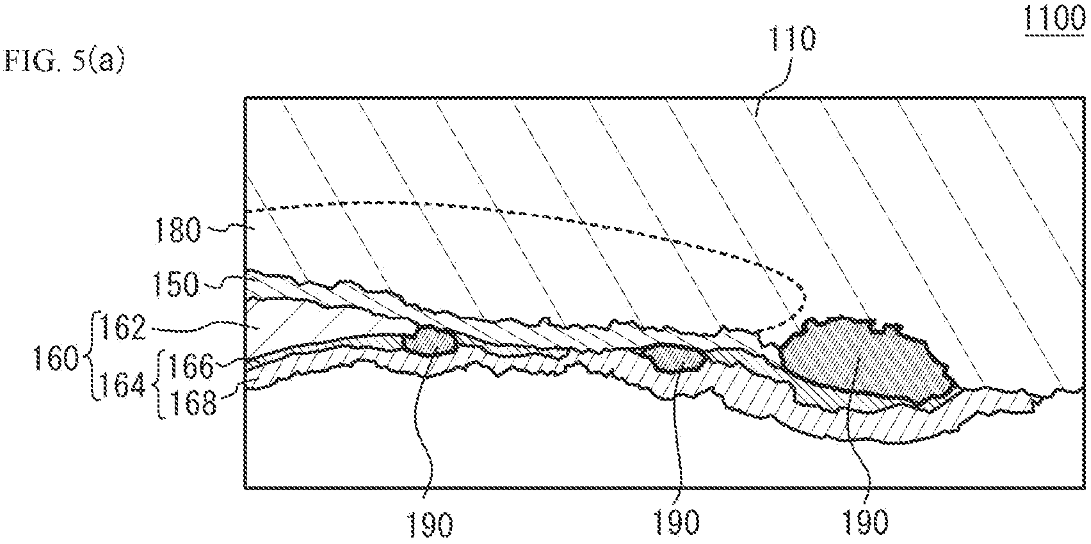
FIG. 5 (*a*) is a cross-sectional drawing of the vicinity of an external electrode of a coil component according to a second reference form, and FIG. 5 (*b*) is a cross-sectional drawing prior to formation of the plating film.
Figure 5B:
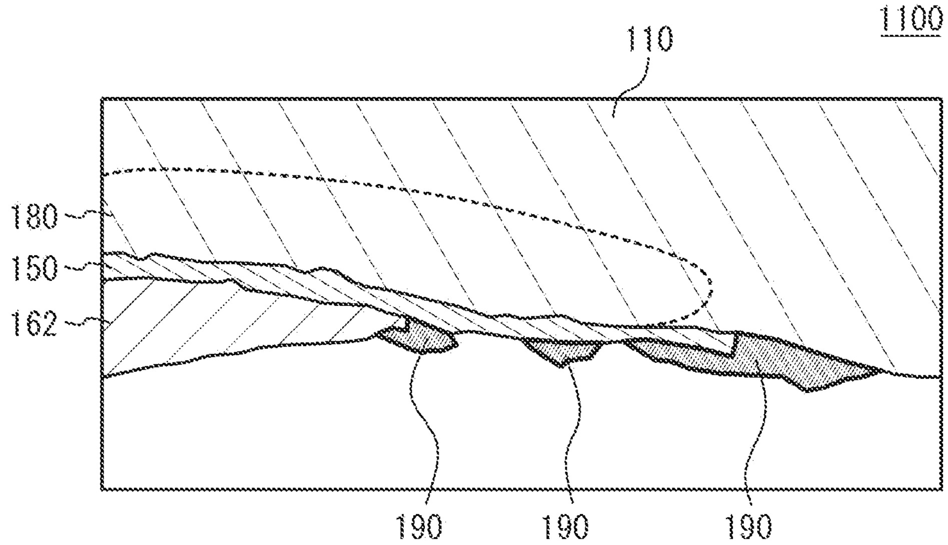
Figure 6A:
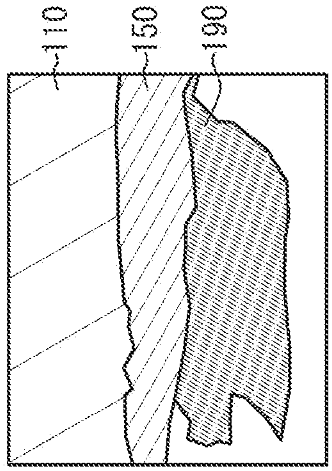
FIG. 6 (*a*) is a schematic diagram of a scanning electron microscope image of the vicinity of the segregant, and FIG. 6 (*b*) through FIG. 6 (*d*) are schematic diagrams of energy dispersive x-ray analyses of the part in FIG. 6 (*a*).
Figure 6B:
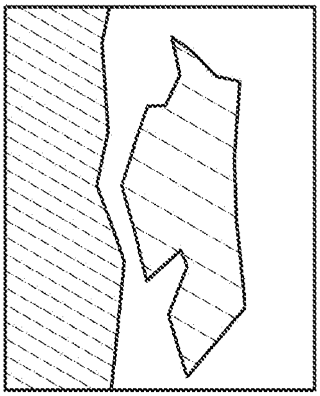
Figure 6C:
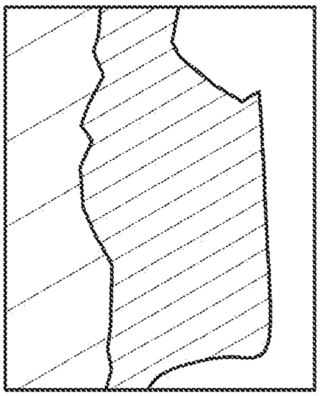
Figure 6D:
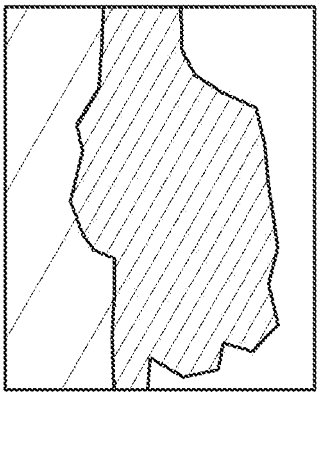

FIG. 5 (*a*) is a cross-sectional drawing of the vicinity of an external electrode 160 of a coil component 1100 according to the second reference form, and FIG. 5 (*b*) is a cross-sectional drawing prior to formation of the plating film 164. FIG. 5 (*a*) and FIG. 5 (*b*) are diagrams showing schematically SEM images wherein the cross section of the coil component 1100 is observed using a scanning electron microscope (SEM). In the coil component 1100 that is shown, the magnetic substrate 110 is formed through bonding metal magnetic particles, made from a soft magnetic material of Fe—Si—Cr, through an oxide film that is formed on the surface of the metal magnetic particles, the same as in the first reference form. The coil conductor 130 is formed from silver, the external electrode 160 is formed, through an electrolytic plating method, from a metal film 162 made from silver, and the plating film 164 is formed from a nickel plating film 166 and a tin plating film 168, formed through an electrolytic plating method. The glass film 150 is formed from a borosilicate glass that does not include a titanium oxide filler.

As depicted in FIG. 5 (*a*), even when the glass film 150 is formed on the surface of the magnetic substrate 110, still the plating film 164 is formed extending further to the outside than the metal film 162. Moreover, the region 180 of the magnetic substrate 110 in the periphery of the glass film 150 is observed to be different from the other regions of the magnetic substrate 110. Additionally, it was observed that segregant 190 has been formed between the glass film 150 and the nickel plating film 166, between the magnetic substrate 110 and the nickel plating film 166, etc. As depicted in FIG. 5 (*b*), the discolored region 180 and the segregant 190 were observed even prior to formation of the plating film 164.

The segregant 190 was evaluated next using energy dispersive x-ray analysis (EDS). FIG. 6 (*a*) is a schematic diagram of an SEM image wherein the vicinity of the segregant 190 was observed using a scanning electron microscope (SEM), where FIG. 6 (*b*) through FIG. 6 (*d*) are schematic diagrams of energy dispersive x-ray analysis (EDS) images of the part in FIG. 6 (*a*). In FIGS. 6 (*b*), 6 (*c*), and 6 (*d*), the K lines of iron, silicon, and oxygen, respectively, are mapped. The hatching region is the region wherein the applicable element is present at a high proportion, where a region where the hatching is dense indicates the inclusion proportion of the element being greater than a region wherein the hatching is sparse (where this applies to FIG. 7 (*b*) through FIG. 7 (*e*), below, as well).

As depicted in FIG. 6 (*a*), in the image wherein energy dispersive x-ray analysis (EDS) has been performed, a glass film 150 is formed on the surface of the magnetic substrate 110, and a segregant 190 is formed on the surface of the glass film 150. As depicted in FIG. 6 (*b*) to FIG. 6 (*d*), it is confirmed that iron, silicon, and oxygen are distributed in the segregant 190. It is assumed that the inclusion of iron, silicon, and oxygen in the segregant 190 is due to the following. Specifically, it is assumed that the glass film 150 softens during the heat treatment for forming the magnetic substrate 110, and diffuses into the magnetic substrate 110 (which is assumed to be that which forms the discolored region 180), and iron is accepted into the glass film 150 thereby, forming the segregant 190 that includes iron, silicon, and oxygen. It is assumed from the inclusion of iron, silicon, and oxygen in the segregant 190 that oxides of iron and oxides of silicon are included in the segregant 190. While oxides of iron may be hematite ($Fe_2O_3$) or magnetite ($Fe_3O_4$), given that there is a large amount of oxygen in the segregant 190 it is assumed that a large amount of magnetite is included as the oxide of iron. The electrical resistivity of magnetite is low when compared to the resistivity of the silicon dioxide ($SiO_2$) in the glass film 150. Consequently, it is assumed that the electrical resistance is reduced through segregation of the segregant 190 on the bottom face of the glass film 150.

It is believed that the formation of the plating film 164 extending from the metal film 162 to the bottom face of the glass film 150 and the bottom face of the magnetic substrate 110 is because the electrical resistance is reduced through the segregation of the segregant 190 on the bottom face of the glass film 50 in this way.

Evaluation of the First Embodiment

FIG. 7 (*a*) is a schematic diagram of an SEM image wherein a cross-section of the coil component 300 of the first embodiment was observed using a scanning electron microscope (SEM), where FIG. 7 (*b*) through FIG. 7 (*e*) are schematic diagrams of energy dispersive x-ray analysis (EDS) images of the part in FIG. 7 (*a*). In FIGS. 7 (*b*), 7 (*c*), 7 (*d*), and 7 (*e*), the K lines of iron, silicon, oxygen, and titanium, respectively, are mapped. FIG. 7 (*a*) is a schematic diagram of an SEM image prior to formation of the plating film 64, where the glass film 50 is formed on the surface of the magnetic substrate 10, and a metal film 62 is formed on the surface of the glass film 50. In the coil component 300 that was observed, the magnetic substrate 10 was formed through bonding together the metal magnetic particles, made of a soft metallic alloy of Fe—Si—Cr, through an oxide film formed on the surfaces of the metal magnetic particles. The metal film 62 of the external electrodes 60 was formed from silver, and the glass film 50 was formed from a borosilicate glass that includes a titanium oxide filler. In the example in FIG. 7 (*a*) through FIG. 7 (*e*), the inclusion proportion of the titanium oxide filler was 25 vol %.

As depicted in FIG. 7 (*a*), in the coil component 300 according to the first embodiment, no discolored region was Observed in the magnetic substrate 10, and no segregant was observed on the surface of the magnetic substrate 10 or the surface of the glass film 50. It is assumed that the reason why the use of a glass film 50 that includes a titanium oxide filler suppresses discoloration of the magnetic substrate 10 and formation of segregant on the surface of the magnetic substrate 10 and the surface of the glass film 50 is as follows. Specifically, it is assumed that the use, in the glass film 50, of a borosilicate glass that includes a titanium oxide filler causes the glass film 50 to be resistant to softening, and, even if softened, lessens the reduction in viscosity of the glass film 50, despite performing a heat treatment to form the magnetic substrate 10. This is assumed to be because the glass component is held on the periphery of the titanium oxide filler. Because of this, it is assumed that, despite performing a heat treatment to form the magnetic substrate 10, diffusion of the glass film 50 into the magnetic substrate 10 is prevented, where the result is suppression of discoloration of the magnetic substrate 10 and suppression of the formation of segregant on the surfaces of the magnetic substrate 10 and the glass film 50.

As depicted in FIG. 7 (*b*), iron was distributed within the magnetic substrate 10, and substantially not distributed in the glass film 50. As depicted in FIG. 7 (*c*), silicon was distributed in both the magnetic substrate 10 and the glass film 50, but the glass film 50 had a larger inclusion proportion than in the magnetic substrate 10. As depicted in FIG. 7 (*d*), a large amount of oxygen was included in the glass film 50, and a small amount was included in the magnetic substrate 10 as well. As depicted in FIG. 7 (*e*), a large amount of titanium was included in the glass film 50, and substantially not included in the magnetic substrate 10.

Figure 8A:
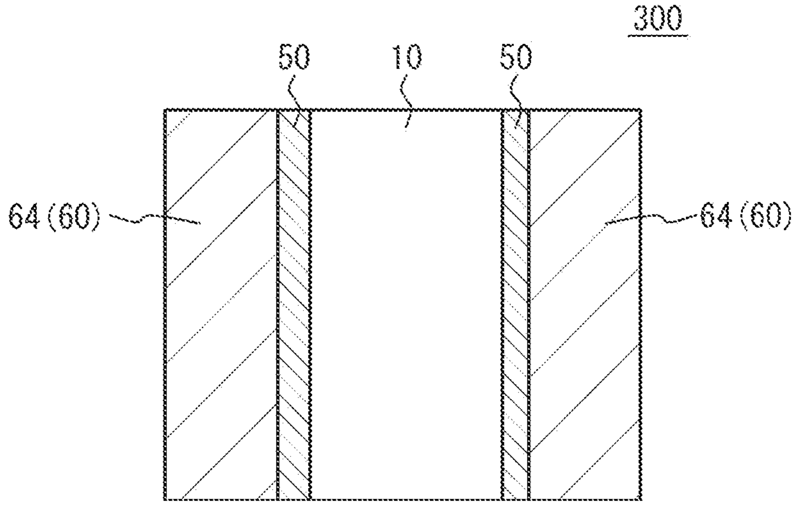
FIG. 8 (*a*) is a bottom view of a coil component according to a first embodiment, and FIG. 8 (*b*) is a cross-sectional drawing of the vicinity of the external electrode.
Figure 8B:
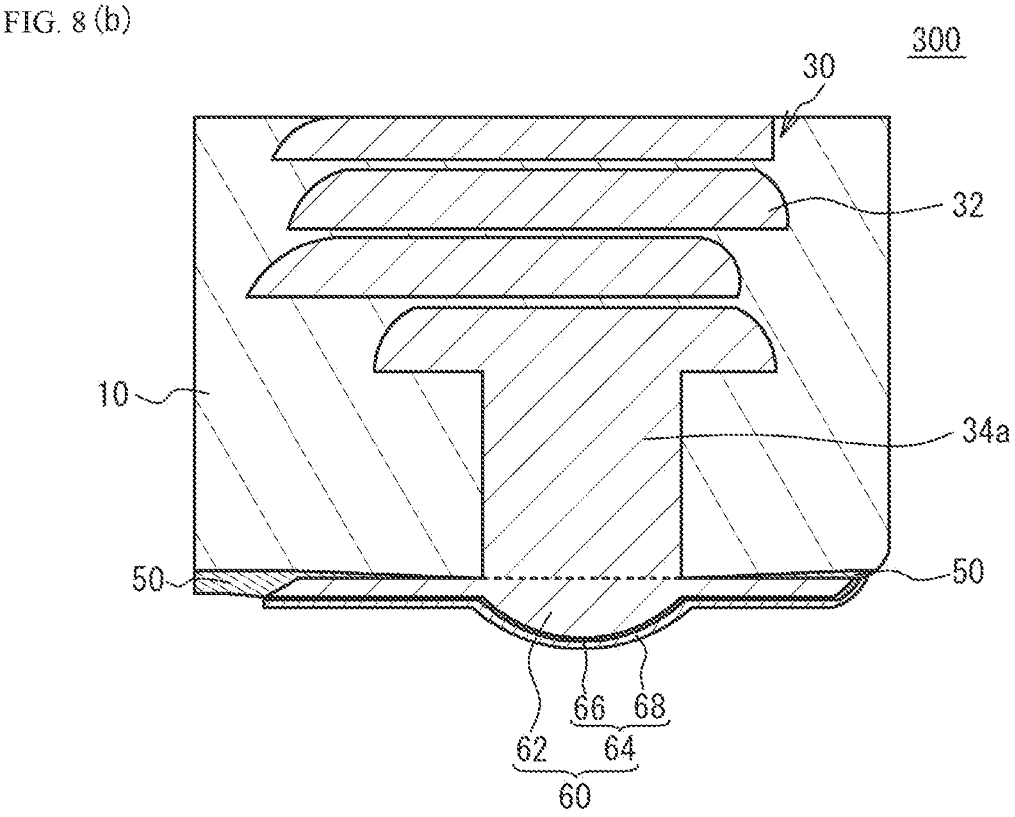

FIG. 8 (*a*) is a bottom view of a coil component 300 according to the first embodiment, and FIG. 8 (*b*) is a cross-sectional drawing of the vicinity of the external electrodes 60. FIG. 8 (*a*) is a diagram showing schematically a microscopic image wherein the bottom face of the coil component 300 is viewed through an optical microscope, and FIG. 8 (*b*) is a diagram showing schematically an SEM image wherein a cross section of the coil component 300 is observed using a scanning electron microscope (SEM). In the coil component 300 that is shown, as with the above, the magnetic substrate 10 is formed through bonding metal magnetic particles, made from a soft magnetic material of Fe—Si—Cr, through an oxide film that is formed on the surface of the metal magnetic particles. The metal film 62 of the external electrodes 60 and the coil conductor 30 was formed from silver, and the glass film 50 was formed from a borosilicate glass that includes a titanium oxide filler. In the example in FIG. 8 (*a*) and FIG. 8 (*b*), the inclusion proportion of the titanium oxide filler was 25 vol %. The plating film 64 of the external electrodes 60 was formed through an electrolytic plating method, and was structured from a nickel plating film 66 and a tin plating film 68.

As depicted in FIG. 8 (*a*) and FIG. 8 (*b*), in the coil component 300 according to the first embodiment, formation of the plating film 64 extending from the metal film 62 to the outside was prevented. This is believed to be because the use of the glass film 50 that includes the titanium oxide filler prevented the formation of segregant at the surface of the glass film 50 and the surface of the magnetic substrate 10, as depicted in FIG. 7 (*a*).

In this way, in the first embodiment a glass film 50 made from a borosilicate glass that includes a titanium oxide filler is provided on the surface of the magnetic substrate 10, as illustrated in FIG. 1 (*a*) and FIG. 2. The external electrode 60 is provided in contact with the glass film 50. Through forming the glass film 50 from a borosilicate glass that includes the titanium oxide filler, formation of the segregant on the surface of the glass film 50 is suppressed, even when a heat treatment is carried out in the step for manufacturing the magnetic substrate 10, preventing a reduction in electrical resistance. Thus the formation of the external electrodes 60 in contact with such a glass film 50 is able to suppress the external electrodes 60 from being formed extending to unintended parts.

Note that while, in the first embodiment, set forth above, an example was illustrated wherein the glass film 50 was formed from a borosilicate glass that includes a titanium oxide filler, there is no limitation thereto, but rather it may instead be formed from a borosilicate glass that includes a filler that is an oxide of zirconium (zirconium oxide), as a metal element that has little reactivity with Fe and that has a high softening point when made into a glass. Moreover, for the same reasons as described above, the glass film 50 may instead be made from a borosilicate glass that includes a tungsten oxide filler. In addition, the glass film 50 is not limited to being a borosilicate glass, but only need be a low-temperature sintered glass. The formation of the segregant on the surfaces of the magnetic substrate 10 and the glass film 50 is suppressed in these cases as well.

Moreover, in the first embodiment the external electrode 60 is structured including a metal film 62 and a plating film 64 on the metal film 62. While there is a tendency for the plating film 64 to be formed extending outward when the electrical resistance on the surface of the glass film 50 is low, the use of the glass film 50 made from a low-temperature sintered glass that includes a filler that is titanium oxide, zirconium oxide, and/or tungsten oxide suppresses the reduction in electrical resistance on the surface of the glass film 50, making it possible to prevent the plating film 64 from being formed extending outward.

Moreover, in the first embodiment the glass film 50 includes the filler that is titanium oxide, zirconium oxide, and/or tungsten oxide at no less than 10 vol % (percent by volume). The formation of the external electrodes 60 extending out to an unintended part can be suppressed effectively thereby. From the perspective of suppressing the formation of the external electrodes 60 extending outward to unintended parts, preferably the inclusion proportion of the filler is no less than 15 vol %, more preferably no less than 20 vol %, and even more preferably no less than 25 vol %. On the other hand, from the perspective of manufacturing the glass paste for forming the glass film 50, if the inclusion proportion of the filler were too great it would increase the viscosity of the glass paste, and the dispersibility would be poor. Because of this, if the inclusion proportion of the filler were not less than 60 vol %, manufacturing of the glass paste in industry, would be difficult, where no greater than 50 vol % is preferred, and, in consideration of the viscosity characteristics when considering ease of printing, no greater than 40 vol % is even more preferred. The glass part and the filler part in the glass film 50 can be identified through SEM observations. For example, the glass part is observed in irregular shapes. The filler part is observed as particles having grain boundaries. The two can be distinguished through contrast, and can be distinguished through carrying out component analysis through EDS analysis. The inclusion proportion of the filler within the glass film 50 can be calculated from the area of the filler and the area of the other glass parts, in a plan view, when the glass film 50 is observed enlarged to between 2000× and 20,000× by an SEM. The filler part and the other glass parts can be distinguished through contrast, and the respective areas can be calculated using, for example, binarization or gradation technologies. Moreover, even when distinguishing by contrast is difficult, the respective areas can be calculated by distinction between the filler part and the other glass parts by finding the element compositions of those parts through carrying out mapping through EDS analysis.

Moreover, in the first embodiment, the glass film 50 is in contact with the ridges (edges) of the magnetic substrate 10. The ridges (edges) and vertices (corners) of the magnetic substrate 10 receive physical impacts through the manufacturing process (for example, barrel polishing, processing to remove contamination, and the like), and thus tend to have reduced electrical resistance through damage to the oxide film that formed on the surfaces of the metal magnetic particles, so there is a tendency for the external electrodes 60 to be formed extending outward. Consequently, the provision of the glass film 50 in contact with the ridges (edges) of the magnetic substrate 10 enables effective suppression of the formation of the external electrodes 60 extending to unintended parts.

Moreover, in the first embodiment, the glass film 50 is layered between the magnetic substrate 10 and the external electrode 60, except for the parts wherein the lead portion 34*a* or lead portion 34*h* is exposed from the magnetic substrate 10 and the parts of the opening 52*a* and the opening 52*b* that are provided in the periphery thereof, and has an outer shape that is larger than that of the external electrode 60. That is, in the plan view the external electrode 60 does not cover all of the glass film 50, and the glass film 50 is a part that can be seen alone. This enables effective suppression of formation of the external electrodes 60 extending out to unintended parts.

Moreover, in the first embodiment preferably the glass film 50 is of a color that is different from that of the external electrode 60. This enables the determination as to whether or not the external electrode 60 is formed extending out to unintended parts to be done through carrying out image recognition. In other words, it is possible to prevent, in image recognition, mistaking the region wherein the glass film 50 is provided as being a region formed by the extension of the external electrodes 60. The difference in color from that of the external electrodes 60 may be applied through the glass film 50 including a filler that is manganese oxide, cobalt oxide, and/or ferrite. Having the glass film 50 be a color that is different from that of the external electrodes 60 can be achieved easily thereby.

Note that in the first embodiment, set forth above, preferably barrel polishing is carried out on the chip layered body after heat treatment in the manufacturing process for the coil component 300. Carrying out barrel polishing chamfers the ridges (edges) of the magnetic substrate 10, facilitating exposure of the glass film 50, as depicted in FIG. 9. Although the ridges (edges) of the magnetic substrate 10 are locations wherein there is a tendency for the plating film 64 to be formed extending outward, exposing these locations to the glass film 50 enables suppression of the extension of the plating film 64, enabling suppression of formation of the external electrodes 60 to unintended parts.

Modified Example of the First Embodiment

FIG. 10 is a plan view of a coil component 310 according to a modified example according to the first embodiment. In FIG. 10, the view is through the external electrode 60. With the coil component 310 according to the modified example of the first embodiment, as depicted in FIG. 10, the glass film 50 has a squared-C shape that extends along the ridge (edge) of the magnetic substrate 10, The ridge (edge) of the magnetic substrate 10 is a location at which there is a tendency for the plating film to be formed extending out. Even when the glass film 50 is in this shape, the extension of the plating film is actually prevented at locations where there is a tendency for the plating film to be formed extending out, making it possible to suppress formation of the external electrodes 60 at unintended parts.

Second Embodiment

Figure 11A:
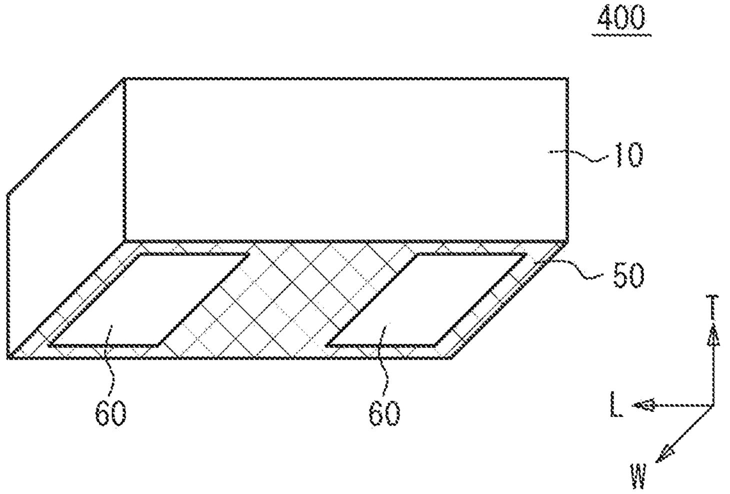
FIG. 11 (*a*) is a perspective diagram of a coil component according to a second embodiment according to the present application, and FIG. 11 (*b*) is a cross-sectional drawing of the coil component of FIG. 11 (*a*).
Figure 11B:
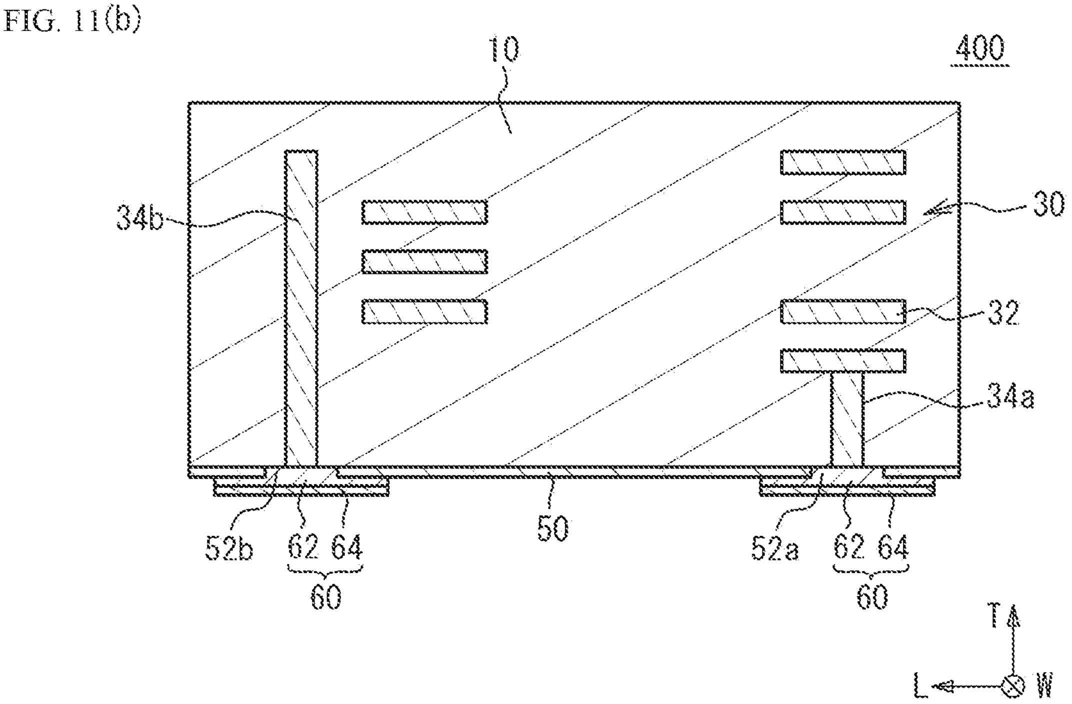

FIG. 11 (*a*) is a perspective diagram of a coil component 400 according to a second embodiment according to the present invention, and FIG. 11 (*b*) is a cross-sectional drawing of the coil component 400 in FIG. 11 (*a*). As depicted in FIG. 11 (*a*) and FIG. 11 (*b*), in the coil component 400 according to the second embodiment, the glass film 50 is provided over the entire region of the bottom face of the magnetic substrate 10 with the exception of the parts wherein the lead portion 34*a* and the lead portion 34*b* are exposed from the magnetic substrate 10 and the parts of the opening 52*a* and the opening 52*b* that are provided therearound. The other structures are identical to the coil component 300 according to the first embodiment, and thus explanations thereof are omitted.

In the second embodiment as well, a glass film 50, formed from a low-temperature sintered glass that includes a metal oxide filler of titanium oxide ($TiO_2$), zirconium oxide ($ZrO_2$), and/or tungsten oxide ($WO_3$) is provided, on the surface of the magnetic substrate 10. For example, a glass film 50 made from a borosilicate glass that includes, for example, a titanium oxide filler is provided, and the external electrode 60 is provided in contact with the glass film 50. The formation of the external electrodes 60 extending to an unintended part is suppressed thereby, in the same manner as with the first embodiment.

Moreover, in the second embodiment the provision of the glass film 50 over the bottom face of the magnetic substrate 10 as a whole enables a further suppression of formation of the external electrodes 60 in unintended parts. Moreover, the provision of the glass film 50 over the bottom face of the magnetic substrate 10 as a whole means that the glass film 50 will exist between the external electrodes 60, enabling suppression of shorting between the external electrodes 60.

Third Embodiment

Figure 12A:
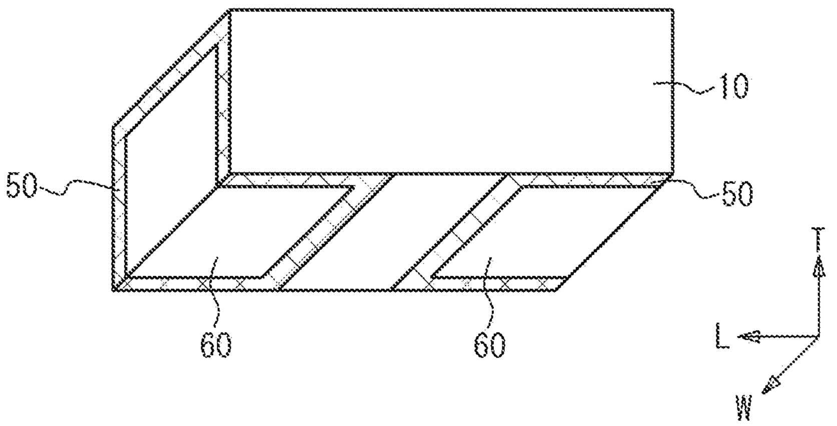
FIG. 12 (*a*) is a perspective diagram of a coil component according to a third embodiment according to the present invention, and FIG. 12 (*b*) is a cross-sectional drawing of the coil component of FIG. 12 (*a*).
Figure 12B:
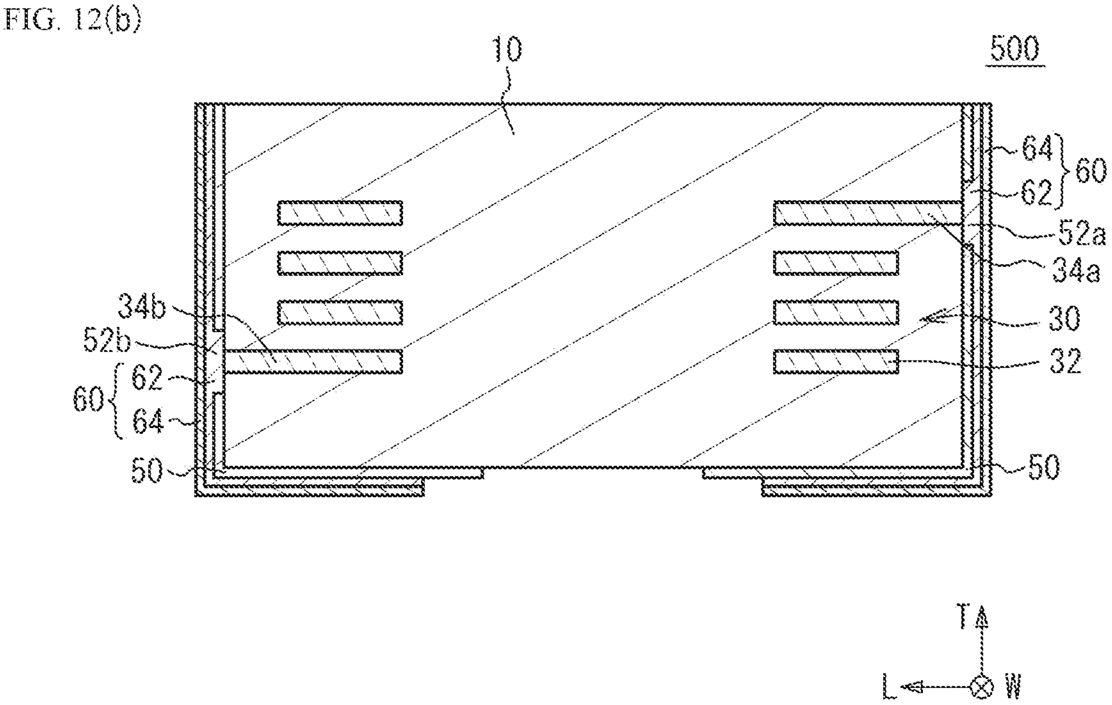

FIG. 12 (*a*) is a perspective diagram of a coil component 500 according to a third embodiment according to the present invention, and FIG. 12 (*b*) is a cross-sectional drawing of the coil component 500 in FIG. 12 (*a*). In the coil component 500 according to the third embodiment, as depicted in FIG. 12 (*a*) and FIG. 12 (*b*), the glass film 50 extends from the bottom face of the magnetic substrate 10 onto the end faces (the WT faces). The external electrode 60 also, similarly, extends from the bottom face of the magnetic substrate 10 onto the end faces. The lead portions 34*a* and 34*b* are formed extending in the L-axial direction, and connect to the external electrodes 60 on the end faces of the magnetic substrate 10. To form the glass film 50 and the external electrodes 60 on the end faces (the WT faces) of the magnetic substrate 10, preferably they are formed in a step after dicing, and thus the formation of the insulator pattern that will serve as the glass film 50 and of the unbaked conductor pattern that will serve as the metal film 62 of the external electrodes 60 is through sequentially forming individually in a stage after dicing or after the heat treatment. The other structures are identical to those of the coil component 300 according to the first embodiment, and thus explanations thereof will be omitted.

In the third embodiment as well, a glass film 50, formed from a low-temperature sintered glass that includes a metal oxide filler of titanium oxide ($TiO_2$), zirconium oxide ($ZrO_2$), and/or tungsten oxide ($WO_3$) is provided, on the surface of the magnetic substrate 10. For example, a glass film 50 made from a borosilicate glass that includes, for example, a titanium oxide filler is provided, and the external electrode 60 is provided in contact with the glass film 50. The formation of the external electrodes 60 extending to an unintended part is suppressed thereby, in the same manner as with the first embodiment. The external electrodes 60 extending from the bottom face of the magnetic substrate 10 onto the end faces enables the end faces (the WT faces) to be secured by solder frit when mounting the coil component onto a circuit board. This makes it possible to achieve high mounting strength.

Fourth Embodiment

Figure 13A:
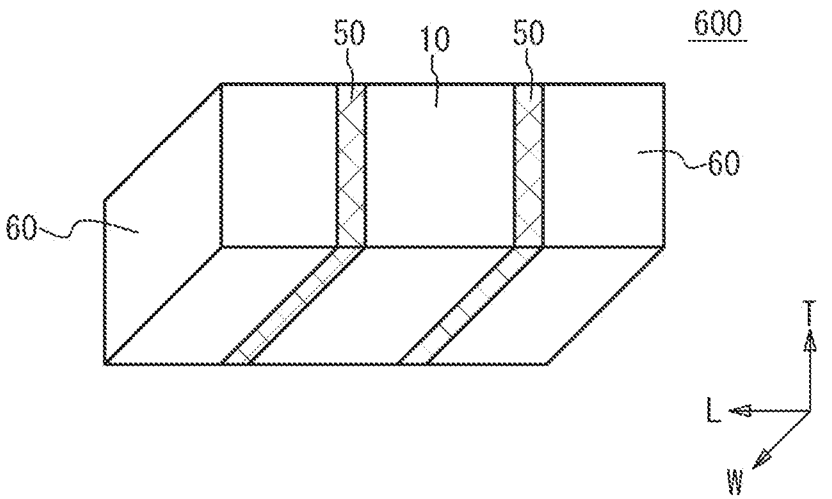
FIG. 13 (*a*) is a perspective diagram of a coil component according to a fourth embodiment according to the present invention, and FIG. 13 (*b*) is a cross-sectional drawing of the coil component of FIG. 13 (*a*).
Figure 13B:
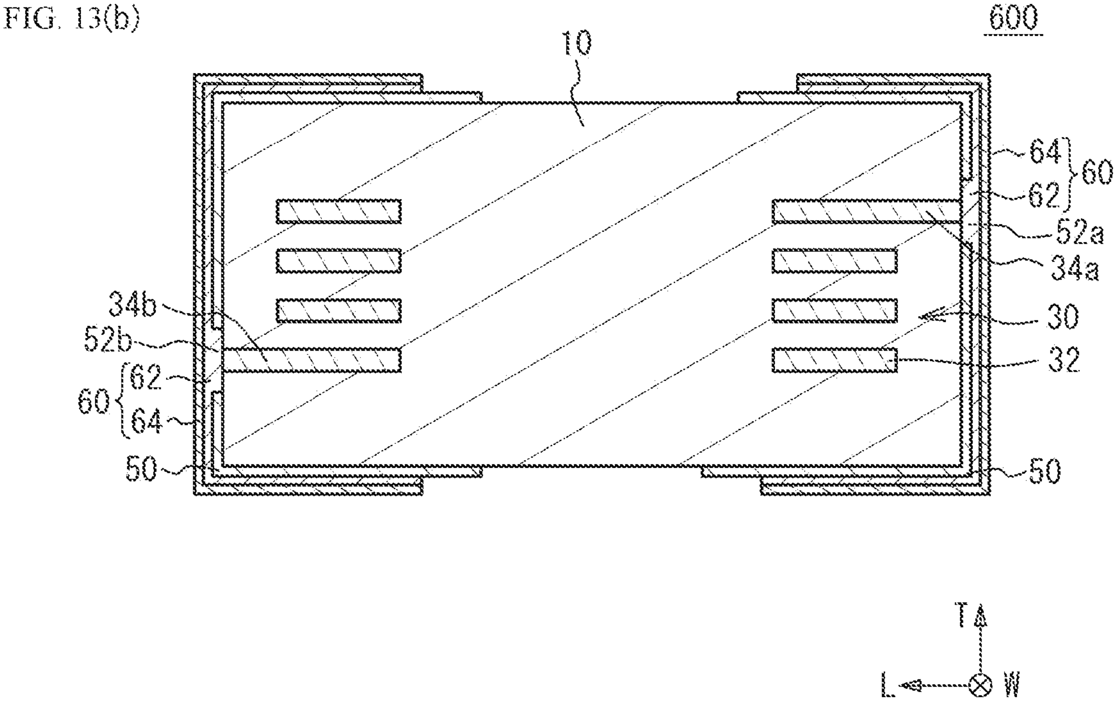

FIG. 13 (*a*) is a perspective diagram of a coil component 600 according to a fourth embodiment according to the present invention, and FIG. 13 (*b*) is a cross-sectional drawing of the coil component 600 in FIG. 13 (*a*). In the coil component 600 according to the fourth embodiment, as depicted in FIG. 13 (*a*) and FIG. 13 (*b*), the glass film 50 extends from the bottom face of the magnetic substrate 10 to the top face via the end faces (the WT faces) and the side faces (the LT faces). The external electrodes 60 also, similarly, extend from the bottom face of the magnetic substrate 10 to the top face, via the end faces and the side faces. The lead portions 34*a* and 34*b* are formed extending in the L-axial direction, and connect to the external electrodes 60 on the end faces of the magnetic substrate 10. To form the glass film 50 and the external electrodes 60 on the end faces (the WT faces) and the side faces (the LT faces) of the magnetic substrate 10, preferably they are formed in a step after dicing, and thus the formation of the insulator pattern that will serve as the glass film 50 and of the unbaked conductor pattern that will serve as the metal film 62 of the external electrodes 60 is through sequentially forming individually in a stage after dicing or after the heat treatment. The other structures are identical to the coil component 300 according to the first embodiment, and thus explanations thereof are omitted.

In the fourth embodiment as well, a glass film 50, formed from a low-temperature sintered glass that includes a metal oxide filler of titanium oxide ($TiO_2$), zirconium oxide ($ZrO_2$), and/or tungsten oxide ($WO_3$) is provided, on the surface of the magnetic substrate 10. For example, a glass film 50 made from a borosilicate glass that includes, for example, a titanium oxide filler is provided, and the external electrode 60 is provided in contact with the glass film 50. The formation of the external electrodes 60 extending to an unintended part is suppressed thereby, in the same manner as with the first embodiment. The external electrode 60 extending from the bottom face of the magnetic substrate 10 to the top face via the end faces (the WT faces) and the side faces (the LT faces) enables the end faces (the WT faces) and the side faces (the LT faces) to be secured by solder frit when mounting the coil component onto a circuit board. This makes it possible to achieve high mounting strength. Moreover, this enables both the top face and the bottom face to be used as the face for mounting onto the substrate, rendering it unnecessary to lineup the up/down orientations during packaging.

Fifth Embodiment

In the first embodiment through the fourth embodiment, described above, examples were presented of layered coil components, but in the fifth embodiment an example of a winding-type coil component will be presented. FIG. 14 is a cross-sectional diagram of a coil component 700 according to a fifth embodiment according to the present invention. As depicted in FIG. H, in the coil component 700 according to the fifth embodiment, the magnetic substrate 10 has a shaft portion 70, and the pair of flange portions 72 that are provided on both ends of the shaft portions 70. The coil conductor 30 is formed through wrapping, around the shaft portion 70, a lead wire 74 that has an insulating coating. Glass films 50 are provided on both of the pair of flange portions 72, and external electrodes 60 are provided on the glass films 50. The external electrode 60 that is provided on one of the flange portions 72 is connected electrically to one end of the coil conductor 30, and the external electrode 60 that is provided on the other flange portion 72 is connected electrically to the other end of the coil conductor 30. Note that while in FIG. 14 an example is shown wherein the glass films 50 and external electrodes 60 are provided on both of the two flange portions 72, the glass film 50 and two external electrodes 60 may instead be provided on one of the two flange portions 72.

In the fifth embodiment as well, a glass film 50, formed from a low-temperature sintered glass that includes a metal oxide filler of titanium oxide ($TiO_2$), zirconium oxide ($ZrO_2$), and/or tungsten oxide ($WO_3$) is provided, on the surface of the magnetic substrate 10. For example, a glass film 50 made from a borosilicate glass that includes, for example, a titanium oxide filler is provided, and the external electrode 60 is provided in contact with the glass film 50. The formation of the external electrodes 60 extending to an unintended part is suppressed thereby, in the same manner as with the first embodiment.

FIG. 15 is a cross-sectional drawing of an electronic device 800 comprising a coil component 300 according to the first embodiment according to the present invention. As depicted in FIG. 15, in the electronic device 800 the coil component 300 is mounted on a circuit board 90. In the coil component 300, the external electrodes 60 are bonded to land electrodes 94 of the circuit board 90 by solder 92, to mount onto the circuit board 90. Because, in the coil component 300, formation of the external electrodes 60 on unintended parts is suppressed, this enables prevention of adverse effects on other electronic components, even when other electronic components are packaged near the coil component 300. The electronic device 800 may be, for example, a smart phone, a tablet terminal, a game console, or the like. Note that the coil component mounted on the circuit board 90 may instead be a coil component 400 through 700 according to the second embodiment through the fifth embodiment.

EMBODIMENTS

Although the invention according to the present application has been explained in detail through embodiments and reference examples, this does not mean that the invention according to the present application is limited to the aspects described in the embodiments. In the coil components of the embodiments and reference examples below, the length dimensions (dimensions in the L-axial direction) are 2.0 mm, the width dimensions (the dimensions in the W-axial direction) are 1.6 ram, and the height dimensions (the dimensions in the T-axial direction) are 0.65 mm. Moreover, in the coil components in the embodiments and reference examples, the form is one wherein the glass film is provided separated in two in the L-axial direction, as in the coil component according to the first embodiment and first reference form, described above. The dimension in the L-axial direction of each of the glass films is 0.5 min, the dimension in the W-axial direction is 1.6 mm, and the dimension in the T-axial direction (the thickness) is 20 μm. For the metal film for structuring each of the external electrodes, the dimension in the L-axial direction is 0.4 mm, the dimension in the W-axial direction is 1.52 mm, and the dimension in the T-axial direction (the thickness) is 20 μm, where the ridge (edge) sides of the magnetic substrate have spacing of 40 μm±20 μm each in respect to the edges of the glass film, and for the sides facing each of the external electrodes, the spacing is 100 μm±20 μm in respect to the edges of the glass film. The T-axial direction dimensions (the thicknesses) of the plating film for structuring the external electrodes are 1 μm for Ni plating and 3 μm for Sn plating.

Embodiment 1

The coil component of Embodiment 1 was manufactured through the process set forth below. For the raw material particles, an alloy pattern with a compositional ratio of silicone: 3.5 wt %, chromium: 1.5 wt %, with the remaining portion being iron and inevitable impurities was used, and a slurry was prepared including this alloy powder, toluene (a solvent) and polyvinyl butyral (a binder). The slurry was coated onto the surface of a base film through a doctor blade method and dried with a hot air dryer, where, after drying, the slurry was cut to a prescribed size to manufacture a magnetic material sheet. If necessary, through holes were formed at prescribed positions of the magnetic material sheet, followed by printing, onto the surface of the magnetic material sheet, an electrically conductive paste including silver powder, butyl carbitol (a solvent), and ethyl cellulose (a binder), followed by drying with a hot air dryer, to manufacture a magnetic material sheet having a precursor for conductor patterns and vias.

A glass paste made from a borosilicate glass that includes a titanium oxide filler was printed onto the bottom face of the magnetic material sheet that would serve as the bottom-most layer of the magnetic substrate, and dried using a hot dryer, to form an insulator pattern that is the precursor of the glass film. Following this, an electrically conductive paste including silver powder, butyl carbitol (a solvent), and ethyl cellulose (a binder) was printed onto the insulator pattern and dried by a hot air dryer, to form a conductor pattern that is a precursor to the metal film for forming the external electrodes.

After layering these magnetic material sheets in a prescribed sequence, they were press-bonded together at a prescribed pressure. The press-bonded unit following press-bonding was cut into chip units and for carrying out a process to remove the binder, and the like, a heat treatment was carried out for one hour at 800° C. in an ambient gas that includes oxygen. The inclusion proportion of titanium oxide filler included in the glass film after the heat treatment was 10 vol %. Following this, an electrolytic plating method was used to form a plating film, made from a nickel plating film and a tin plating film, on the surface of the conductor pattern that is the precursor for the metal film for structuring the external electrodes, to form the external electrodes that are structured from the metal film and the plating film.

Embodiment 2

A coil component was manufactured through the same method as in the first embodiment, except for the inclusion proportion of the titanium oxide filler included in the glass film after the heat treatment being 12 vol %.

Embodiment 3

A coil component was manufactured through the same method as in the first embodiment, except for the inclusion proportion of the titanium oxide filler included in the glass film after the heat treatment being 15 vol %.

Embodiment 4

A coil component was manufactured through the same method as in the first embodiment, except for the inclusion proportion of the titanium oxide filler included in the glass film after the heat treatment being 20 vol %.

Embodiment 5

A coil component was manufactured through the same method as in the first embodiment, except for the inclusion proportion of the titanium oxide filler included in the glass film after the heat treatment being 25 vol %.

Embodiment 6

A coil component was manufactured through the same method as in the first embodiment, except for the inclusion proportion of the titanium oxide filler included in the glass film after the heat treatment being 40 vol %.

Embodiment 7

A coil component was manufactured through the same method as in the first embodiment, except for the inclusion proportion of the titanium oxide filler included in the glass film after the heat treatment being 50 vol %.

Embodiment 8

A coil component was manufactured through the same method as in the first embodiment, except for the inclusion proportion of the titanium oxide filler included in the glass film after the heat treatment being 60 vol %.

Embodiment 9

A coil component was manufactured using the same manufacturing method as in Embodiment 1 except for forming the glass film using a glass paste made from a borosilicate glass that includes a zirconium oxide filler, with the inclusion proportion of the zirconium oxide filler included in the glass film after the heat treatment being 25 vol %.

Embodiment 10

A coil component was manufactured using the same manufacturing method as in Embodiment 1 except for forming the glass film using a glass paste made from a borosilicate glass that includes a zirconium oxide filler, with the inclusion proportion of the zirconium oxide filler included in the glass film after the heat treatment being 50 vol %.

Reference Example

A coil component was manufactured using the same method as in Embodiment 1, except for forming the insulator pattern that is the precursor for the glass film using a glass paste made from a borosilicate glass that does not include a titanium oxide filler or a zirconium oxide filler.

Energy dispersive x-ray analyses (EDS) were performed on magnetic substrate cross-sections in the vicinity of the external electrodes of the coil components of Embodiment 1 through Embodiment 10 and the Reference Example, and the distances between the tip ends of the metal films (silver films) that structure the external electrodes and the tip ends of the tin plating films that are included in the plating films were measured. Given this, if the distance between the metal film and the tin plating film was 20 μm or greater, this was defined as the plating extending. This evaluation was carried out for 20 coil components each for Embodiment 1 through Embodiment 5 and the reference example, and the proportions of coil components wherein plating extension occurred were calculated.

The results obtained are given in Table 1.

TABLE 1

| | Filler Inclusion Proportion [vol %] | | Rate of Occurrence of |
|---|---|---|---|
| | $TiO_2$ | $ZrO_2$ | Plating Extension [%] |
| Embodiment 1 | 10 | — | 30 |
| Embodiment 2 | 12 | — | 15 |
| Embodiment 3 | 15 | — | 0 |
| Embodiment 4 | 20 | — | 0 |
| Embodiment 5 | 25 | — | 0 |
| Embodiment 6 | 40 | — | 0 |
| Embodiment 7 | 50 | — | 0 |
| Embodiment 8 | 60 | — | 0 |
| Embodiment 9 | — | 25 | 0 |
| Embodiment 10 | — | 50 | 0 |
| Reference Example | — | — | 100 |

As in Table 1, plating extension occurred at a rate of 100% (in all 20 of the coil components) in the reference example that used a glass film that did not include a titanium oxide filler or a zirconium oxide filler. On the other hand, in Embodiment 1, which used a glass film that included a titanium oxide filler at 10 vol %, the proportion of coil components wherein plating extension occurred was reduced to 30%, and in Embodiment 2, which used a glass film that included 12 vol % titanium oxide filler, the proportion of coil components wherein plating extension occurred was reduced to 15%. Moreover, no plating extension occurred in any of the 20 coils of Embodiment 3 through Embodiment 8, which used glass films that included titanium oxide filler that 15 vol %, 20 vol %, 25 vol %, 40 vol %, 50 vol %, or 60 vol %, nor in Embodiment 9 or Embodiment 10, which used glass films that included zirconium oxide filler at 25 vol % or 50 vol %.

In this way, it was confirmed that the use of a glass film that includes a titanium oxide filler or a zirconium oxide tiller suppresses the occurrence of plating extension, enabling prevention of formation of the external electrodes extending to unintended parts. Moreover, it was confirmed that the inclusion proportion of the titanium oxide filler or zirconium oxide filler preferably is no less than 10 vol %, where no less than 12 vol % is more preferred, and no less than 15 vol % is even more preferred.

While embodiments of the invention according to the present application were described in detail, the invention according to the present application is not limited to these specific embodiments, and various modifications and changes are possible within the range of the spirit and intent of the present application, described in the patent claims.

EXPLANATIONS OF REFERENCE SYMBOLS

10: Magnetic Substrate
11 through 15: Magnetic Material Layers
16: Top Cover Layer
17: Bottom Cover Layer
20: Main Unit Portion
30: Coil Conductor
32: Coil Portion
**34*a*, 34*b***: Lead Portions
50: Glass Film
**52*a*, 52*b***: Openings
60: External Electrode
62: Metal Film
64: Plating Film
70: Shaft Portion
72: Flange Portion
74: Lead Wire
90: Circuit Board
92: Solder
94: Land Electrode

110: Magnetic Substrate
130: Coil Conductor
150: Glass Film
160: External Electrode
162: Metal
164: Plating Film
166: Nickel Plating Film
168: Tin Plating Film
180: Region
190: Segregant
300, 310, 400, 500, 600, 700, 1000, 1100: Coil Components
800: Electronic Device

The invention claimed is:

1. A coil component comprising:
a magnetic substrate including metal magnetic particles structured from a soft magnetic alloy that has iron as the main component;
a coil conductor provided on the magnetic substrate;
a glass film, provided on a surface of the magnetic substrate, made from a low-temperature sintered glass including a filler of titanium oxide, zirconium oxide, and/or tungsten oxide; and
an external electrode, provided in contact with the glass film, connected electrically to the coil conductor,
wherein the external electrode includes a metal film, and a plating film on the metal film, and
wherein an edge of the external electrode is located on the glass film and is in contact with the glass film.

2. The coil component set forth in claim 1, wherein:
the glass film includes the filler at no less than 10 vol %.

3. The coil component set forth in claim 1, wherein:
the glass film is made from a borosilicate glass that includes a titanium oxide filler and/or a zirconium oxide filler.

4. The coil component set forth in claim 1, wherein:
the glass film is provided layered between the magnetic substrate and the external electrode, and has an external shape that is larger than that of the external electrode.

5. The coil component set forth in claim 1, wherein:
the glass film is provided in contact with a ridge of the magnetic substrate.

6. The coil component set forth in claim 1, wherein:
the glass film has a color that is different from that of the external electrode.

7. The coil component set forth in claim 6, wherein:
the glass film has a color that is different from that of the external electrode through inclusion of a filler made from manganese oxide, cobalt oxide, and/or ferrite.

8. An electronic device comprising:
the coil component set forth in claim 1; and
a circuit board on which is mounted the coil component.

9. The coil component set forth in claim 1, wherein:
the coil conductor comprises a coil portion;
a lead portion electrically connects an end of the coil portion to the external electrode; and
the glass film encircles a region of contact of the lead portions and the bottom of the magnetic substrate.

10. The coil component set forth in claim 1, wherein:
the metal film fills an opening of the glass film and the metal film covers the glass film.

11. The coil component set forth in claim 1, wherein:
the glass film coves multiple surfaces of the magnetic substrate.

12. The coil component set forth in claim 9, wherein:
the lead portion extends along a length of the magnetic substrate.

* * * * *